United States Patent [19]

Skough

[11] 4,376,448
[45] Mar. 15, 1983

[54] LET-DOWN VALVE

[75] Inventor: Evert B. Skough, Westminster, Calif.

[73] Assignee: Mark Controls Corporation, Evanston, Ill.

[21] Appl. No.: 228,124

[22] Filed: Jan. 26, 1981

[51] Int. Cl.³ .................. F16K 43/00; F17D 3/00; F16K 47/04
[52] U.S. Cl. .................. 137/329.02; 137/329.05; 137/625.3; 137/625.33; 251/58; 251/121
[58] Field of Search .............. 137/329.01, 329.02, 137/329.03, 329.04, 329.05, 625.28, 625.3, 625.33; 251/205, 120, 121, 58

[56] References Cited

U.S. PATENT DOCUMENTS

| | | | |
|---|---|---|---|
| 2,500,750 | 3/1950 | Halenza | 251/120 |
| 2,637,985 | 5/1953 | Ray | 137/625.3 |
| 3,631,891 | 1/1972 | Brumm | 137/625.3 |
| 3,821,968 | 7/1974 | Barb | 137/625.3 |
| 3,900,475 | 11/1976 | Myers | 137/625.3 |
| 4,103,702 | 8/1978 | Duthion et al. | 137/625.3 |
| 4,244,388 | 1/1981 | Feiss | 137/625.3 |

Primary Examiner—George L. Walton
Attorney, Agent, or Firm—George J. Netter

[57] ABSTRACT

The valve passes incoming pressurized fluid through a pair of orifices arranged in opposite side walls of a hollow tubular plug to form two fluid jets which impinge upon one another in the plug interior prior to exiting. The orifices are elongated and selectively covered by an adjustable sleeve which is positioned by manipulation of a valve stem extending outwardly of the valve housing. Further pairs of orifices are angularly arranged with respect to the first pair and the sleeve includes parts which cover the other orifices when a first pair are operative. The valve stem is selectively rotatable to position the sleeve to expose another pair of orifices to the pressurized fluid.

6 Claims, 3 Drawing Figures

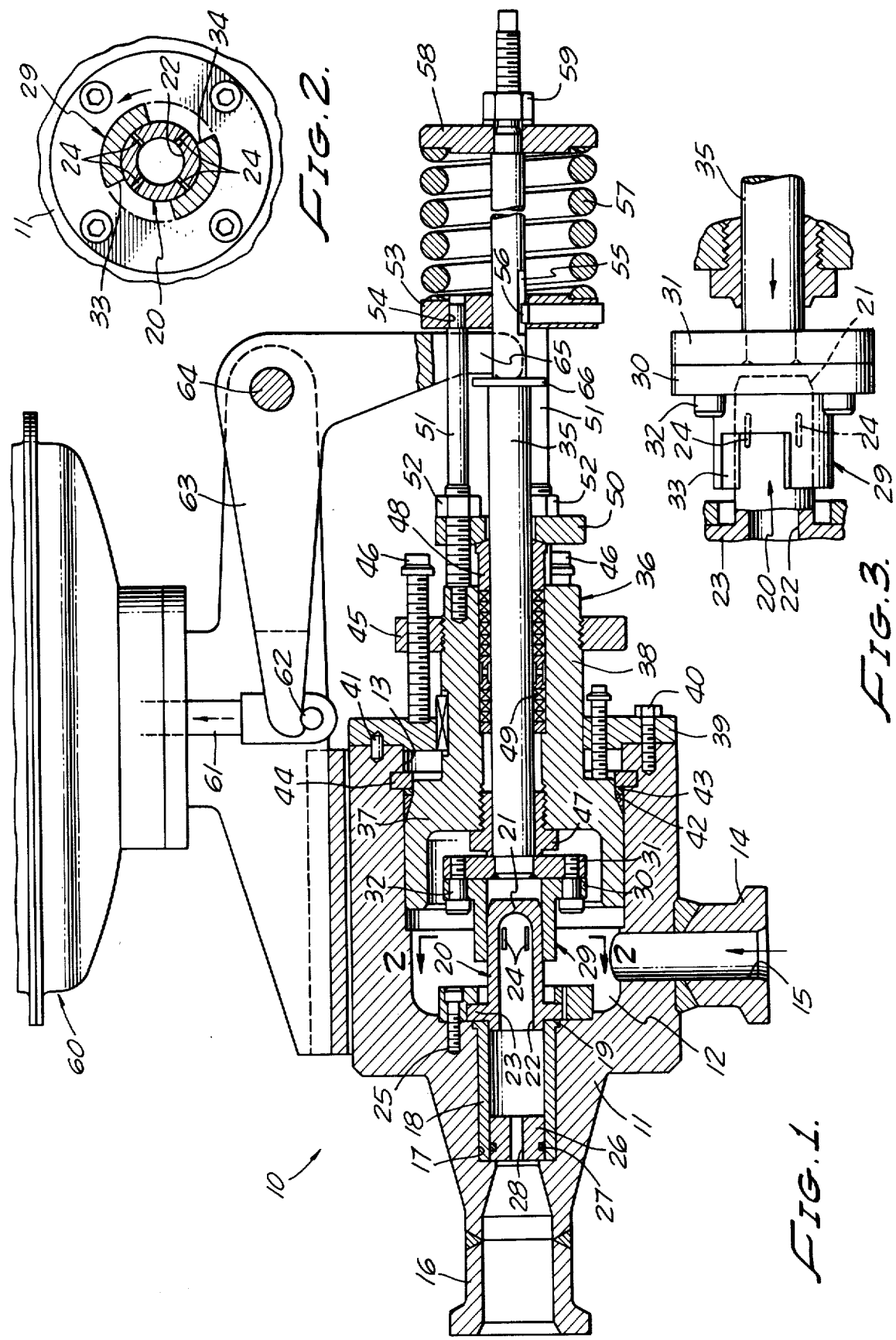

LET-DOWN VALVE

The present invention relates generally to a valve, and, more particularly, to an improved valve construction for providing a selectively variable pressure reduction of a fluid passing therethrough.

BACKGROUND OF THE INVENTION

In the handling of fluids generally, there are many situations in which it is desired to effect a reduction in the fluid pressure and a valve for accomplishing this purpose is frequently referred to as a let-down valve.

Past known let-down valves operate by passing the fluid residing at a first relatively high pressure through at least two orifices in the valve, the jets so formed being directed against each other. All known prior let-down valves have not been completely satisfactory in that they lacked adjustable variability and on clogging or excessive wear of valve orifices replacement and/or repair was a relatively complex and expensive matter.

SUMMARY OF THE INVENTION

A valve constructed in accordance with this invention passes incoming pressurized fluid through a pair of orifices arranged in opposite side walls of a hollow tubular plug to form two fluid jets which impinge upon one another in the plug interior prior to exiting from the valve. The orifices are longitudinally elongated and are selectively covered by an adjustable sleeve which is positioned by a valve stem extending outwardly of the valve housing.

Further pairs of orifices are angularly arranged with respect to the first pair and the sleeve includes parts which cover the other orifices when the first pair are operative. The valve stem is selectively rotatable to position the sleeve in covering relation over the first pair of orifices and expose another pair of opposed orifices to the pressurized fluid.

DESCRIPTION OF THE DRAWING

FIG. 1 is a side elevational, sectional view of the valve of this invention.

FIG. 2 is an end elevational, sectional view taken along the line 2—2 of FIG. 1.

FIG. 3 is an enlarged, side elevational, partially sectional view of the orifice plug and sleeve.

DESCRIPTION OF A PREFERRED EMBODIMENT

With reference now to the drawings, the let-down valve of this invention, enumerated generally as at 10, is depicted which in a way to be described reduces the pressure of an incoming fluid a selectively variable amount prior to its exiting from the valve.

The main valve body 11 is generally cup-shaped with a central cavity 12 and an open end 13. A fitting 14 arranged in a side wall of body 11 is interconnected with an inlet line carrying pressurized fluid to be handled by the valve (arrow) and which fitting is in communication with the central cavity 12 via wall opening 15.

A further fitting 16 interconnects with an outlet line (not shown) and communicates with the cavity 12 through an opening 17 in the body wall, which opening is disposed at approximately ninety degrees from opening 15 and directly opposite the body open end 13. The bore of the fitting is greater in cross-section than that of fitting 14 to accommodate an outlet pipe (not shown) of corresponding size. A hollow cylindrical wear sleeve 18 is snugly received within opening 17 and includes at its internal end an enlarged rim flange 19 which fits into an accommodating valve body recess for positively seating and positioning the sleeve.

An orifice plug 20 includes a hollow cylindrical body having a closed end 21 and an open end 22. A radially extending flange 23 is spaced inwardly from the open end 22. Four (4) longitudinally extending, identically rectangular slots 24 are arranged in a circumferential band inwardly of the closed end 21 and at ninety degree intervals. In assembly, the open end of the orifice plug is received within the sleeve 18 and the flange 23 is secured to the adjacent body wall by threaded members 25.

A back-pressure plug 26 is tightly received within the wear sleeve 18 at the end closely adjacent fitting 16, with a circumferential gasket 27 forming a seal between the plug and sleeve. An orifice 28 of predetermined cross-section passes longitudinally through the plug and serves to admit fluids from the valve interior to the outlet fitting 16 at a prescribed measured rate.

An orifice control sleeve 29 is fittingly received onto the closed end 21 of orifice plug 20 and includes an enlarged mounting rim 30 secured to a drive plate 31 by machine screws 32. More particularly, as can be seen best in FIGS. 2 and 3, the control sleeve 29 has two inner end portions of ninety degrees each and located at opposite sides of the sleeve removed as at 33 and 34. The relative dimensions of the openings 33 and 34 are such that when two diametrically opposed openings 24 lie within the openings 33 and 34, the two remaining openings 24 are continuously closed off by the sleeve portions irrespective of the longitudinal adjustment of the control sleeve. Still further, when the orifice plug end 21 abuts against the plate 31, all of the slots 24 are covered by the sleeve.

An elongated, cylindrical valve stem 35 has one end affixed to the center of plate 31 and outwardly of the valve body through an opening in the valve bonnet 36. In a way to be described, the valve stem is adjustably positioned to control the amount of the orifices 24 covered (and uncovered) by the sleeve 29.

The bonnet 36 has a bell-shaped portion 37 fittingly received within the valve body open end 13 and extends about sleeve 29 and plate 31. The bonnet also has an elongated neck portion 38 integral with the bell-shaped portion 37 and extending outwardly of the valve body in a direction aligned with the orifice plug 20 axis. A cover plate 39 has a central opening which fits over the stem neck portion and is secured to the outer end faces of the valve body by threaded means 40 with proper relative location being assured by pin 41.

As is conventional, the bonnet 36 is provided with a high-pressure resistant seal with respect to the opposed surfaces of the valve body by a soft metal gasket 42 held in place through the combined action of a spacer ring 43 and a segmented ring 44. A ring nut 45 is threaded on the outer end of neck portion 38 and has further threaded openings therein via which threaded members 46 bear against the plate 39. A threaded journal 47 locates and guides the inner end portions of the valve stem 35 and a further sleeve 48 maintains packing 49 about the stem at the outer end parts of the bonnet neck portion. A washerlike plate 50 has a central oversize opening through which the stem passes and is anchored to the bonnet outer end by three elongated shafts 51 via their threaded end parts and nuts 52.

A disclike plate 53 includes a central opening enabling receipt onto the outer end portion of the valve stem and three openings 54 arranged at one hundred twenty (120) degree spacing for accepting the ends of shafts 51. For a purpose to be described, the valve stem has two keying flats 55 (only one is shown) arranged at fifty (50) degrees to one another for cooperating with a key 56 to position the stem at two different angular orientations.

A compression coil spring 57 is positioned on the outer end of the valve stem with one end contacting the plate 53 and the other end contacting a drive plate 58. A nut 59 threads onto the stem outer end to secure the plate 58 in place.

A diaphragm actuator 60 may either be mounted directly to the valve body 11 or conveniently adjacent. Responsive to a driving fluid pressure, the actuator 60 moves a shaft 61 in a direction along its longitudinal axis.

When the shaft 61 moves in the direction of the arrow (FIG. 1) a stud 62 carried by the shaft rotates an L-shaped lever 63 about a pivot 64 causing a bifurcated arm end 65 to drive against a stem flange 66 and move the stem into the valve. Such stem movement compresses spring 57. On removal of the diaphragm actuator fluid pressure, the spring pressure repositions the valve stem to its predetermined initial location.

As to operation of the described valve, fluid at a relatively high pressure enters via the fitting 14 filling the central valve cavity 12. Assuming the orifice control sleeve 29 has been initially adjusted to expose at least a part of the orifices 24 (e.g., FIG. 3) in the plug 20, the pressurized fluid enters through both diametrically opposed orifices 24 substantially simultaneously into the plug interior (FIG. 2). Because of the opposed relationship of the orifices 24, the pressurized fluid passing through the orifices form two jets which impinge upon each other in the plug cavity thereby dissipating a substantial amount of the fluid kinetic energy. The fluid then moves from the plug interior through the backpressure orifice 28 whereby the fluid experiences an expansion which is the reduction in pressure desired.

Where the incoming fluid pressure varies, it may be advisable to change the amount the orifices 24 are exposed by the sleeve 29 accordingly. This is accomplished by determining the upstream pressure of the fluid in the line leading to fitting 14, producing an error signal representative of the difference in the fluid pressure as measured from a prescribed value, converting the error signal to a corresponding change in driving fluid pressure for the diaphragm actuator 60. Such a system is well known in the art and the detailed aspects are accordingly not provided here. With the actuator shaft 61 being repositioned by the pressure sensing system, the control sleeve 29 is adjusted to increase or decrease, as the case may be, the amount of the orifices 24 that lies exposed in the spaces 33 (FIG. 3).

After long use one or both of the orifices 24 may become worn to the extent that they are not satisfactory for further use. When this occurs, it is a simple matter to back off the nut 59 to relieve spring tension and withdraw the key 56. The valve stem 35 is then rotated fifty (50) degrees so that when the key 56 is reengaged on the stem and the nut 59 is repositioned, the stem will be keyed to locate those orifices 24 that had been covered by sleeve 29 in the space 33, and to cover the formerly exposed pair of orifices 24 by the sleeve. The valve is then in condition for use only with the new or unused set of orifices 24.

The described let-down valve includes a valve stem which is slidably positionable within an opening in the valve housing to produce a corresponding continuous adjustment of the valve capacity to effect pressure drop of fluids passing therein. Moreover, although two paired sets of orifices 24 are provided, it is considered within the spirit of the invention to provide further sets of orifices which can be selectively exposed for use by the sleeve 29.

I claim:

1. In a let-down valve having a body with walls defining a cavity, pressurized fluid inlet and outlet openings in the body walls in communication with the cavity, an orifice plug located within the cavity having walls interposed between the inlet and outlet openings, at least two orifices in said plug walls arranged to direct pressurized fluid from the inlet opening into two respective streams impinging upon each other prior to exiting via the outlet opening, the improvement comprising:

said orifice plug being generally a hollow cylinder with one end closed and the other end received over the outlet opening, a plurality of even number sets of orifices formed in the orifice plug side wall and circumferentially arranged and equally spaced, a valve stem having parts located within the valve body cavity and other parts slidably extending through an opening in said body and terminating externally of said body; and means carried by the valve stem parts within the cavity including a hollow sleeve slidingly received on the orifice plug, said sleeve being affixed to parts of the valve stem lying in the cavity and having a pair of openings in the sleeve side wall on opposite sides thereof which can be adjustably positioned to selectively uncover a first pair of diametrically located orifices, and said sleeve being rotatable by the valve stem to expose selectively other pairs of orifices originally covered by said sleeve and to cover the first pair of orifices.

2. A let-down valve as in claim 1, in which said valve stem is rotatable about the body opening within which it is received, and means externally connected to the valve for selectively and fixedly locating the valve stem in any one of several rotative positions.

3. A let-down valve as in claim 1, in which a further plug is located in covering relationship to the outlet opening in the valve body having an orifice therein through which fluid existing from the valve passes.

4. A let-down valve as in claim 1, in which the orifices are elongated and extend parallel to the adjustment direction of the sleeve.

5. A let-down valve as in claim 1, in which further means are provided responsive to the fluid pressure for adjustably positioning said valve stem.

6. A let-down valve as in claim 5, in which said means for adjustably positioning the valve stem includes means for positively driving the valve stem in a first direction and a spring for returning the valve stem in a second direction.

* * * * *